US012627342B2

(12) United States Patent
Kang et al.

(10) Patent No.: US 12,627,342 B2
(45) Date of Patent: May 12, 2026

(54) METHOD FOR TRANSMITTING LAGUERRE-GAUSSIAN BEAMS USING MULTI-UNIFORM CIRCULAR ANTENNA, METHOD FOR RECEIVING LAGUERRE-GAUSSIAN BEAMS. AND COMMUNICATION SYSTEM USING MULTI-UNIFORM CIRCULAR ANTENNA

(71) Applicant: Korea Advanced Institute of Science and Technology, Daejeon (KR)

(72) Inventors: Joonhyuk Kang, Daejeon (KR); Seong Hoon Yoo, Daejeon (KR); Sang Uk Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/784,685

(22) Filed: Jul. 25, 2024

(65) Prior Publication Data

US 2025/0211300 A1     Jun. 26, 2025

(30) Foreign Application Priority Data

Dec. 26, 2023    (KR) ......................... 10-2023-0190676

(51) Int. Cl.
*H04B 7/06* (2006.01)
*H04B 7/0408* (2017.01)
*H04B 7/08* (2006.01)

(52) U.S. Cl.
CPC ......... *H04B 7/0617* (2013.01); *H04B 7/0408* (2013.01); *H04B 7/086* (2013.01)

(58) Field of Classification Search
CPC .. H04B 7/0408; H04B 7/0469; H04B 7/0479;
H04B 7/0617; H04B 7/0695; H04B 7/06952; H04B 7/06958; H04B 7/0696; H04B 7/06962; H04B 7/086; H04B 7/0897; H04B 7/10
USPC ....... 375/259, 260, 262, 265, 267, 295, 347; 370/334; 342/188; 455/101, 103, 272, 455/274
See application file for complete search history.

(56) References Cited

U.S. PATENT DOCUMENTS

| | | | | |
|---|---|---|---|---|
| 2020/0228195 A1* | 7/2020 | Sasaki | .................. | H04B 7/0469 |
| 2020/0396035 A1* | 12/2020 | Yu | ......................... | H04L 5/0089 |
| 2020/0411971 A1* | 12/2020 | Fraysse | ................... | H01Q 3/40 |
| 2022/0182117 A1* | 6/2022 | Thiagarajan | ........... | H04B 7/086 |
| 2023/0006719 A1* | 1/2023 | Ashrafi | ................ | H04B 7/0413 |

(Continued)

FOREIGN PATENT DOCUMENTS

| | | |
|---|---|---|
| KR | 10-2502746 B1 | 2/2023 |
| KR | 10-2573605 B1 | 9/2023 |

*Primary Examiner* — Young T. Tse

(74) *Attorney, Agent, or Firm* — Knobbe, Martens, Olson & Bear, LLP

(57) ABSTRACT

Proposed is a communication system using a multi-uniform circular antenna. The system may include a transmission apparatus including at least one of transmission-side multi-uniform circular antennas configured to transmit a plurality of Laguerre-Gaussian (LG) beams. The system may also include a reception apparatus including at least one of reception-side multi-uniform circular antennas configured to receive the plurality of LG beams. A number of the at least one of the reception-side multi-uniform circular antennas may be set corresponding to a number of the at least one of the transmission-side multi-uniform circular antennas.

8 Claims, 11 Drawing Sheets

(56)  References Cited

U.S. PATENT DOCUMENTS

| | | | |
|---|---|---|---|
| 2023/0396294 A1* | 12/2023 | Huang | H04B 7/0617 |
| 2024/0237017 A1* | 7/2024 | Elshafie | H04W 72/11 |
| 2024/0243884 A1* | 7/2024 | Huang | H04B 7/0697 |

* cited by examiner

FIG.4

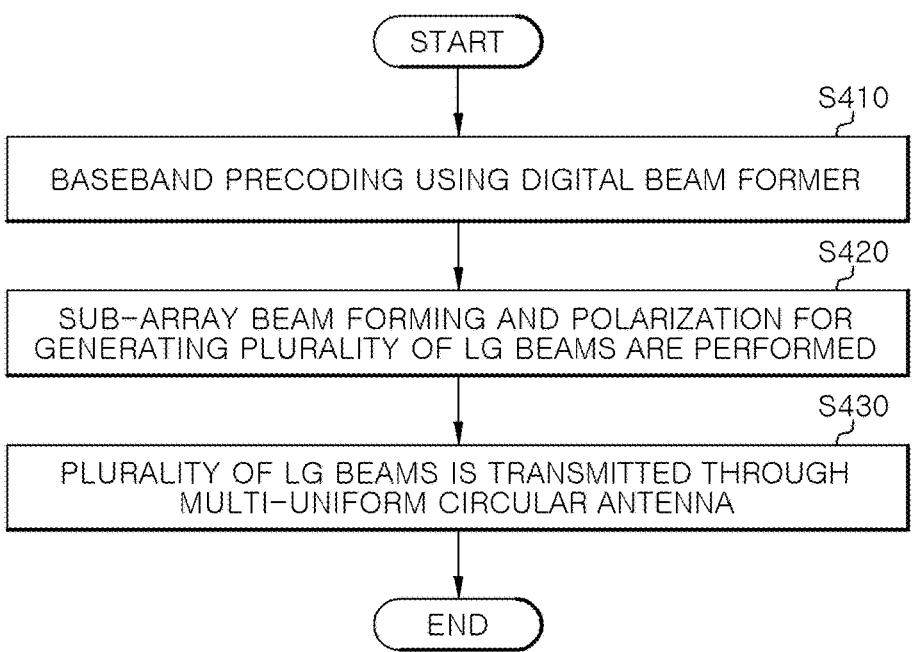

START

S410
BASEBAND PRECODING USING DIGITAL BEAM FORMER

S420
SUB-ARRAY BEAM FORMING AND POLARIZATION FOR
GENERATING PLURALITY OF LG BEAMS ARE PERFORMED

S430
PLURALITY OF LG BEAMS IS TRANSMITTED THROUGH
MULTI-UNIFORM CIRCULAR ANTENNA

END

FIG.5

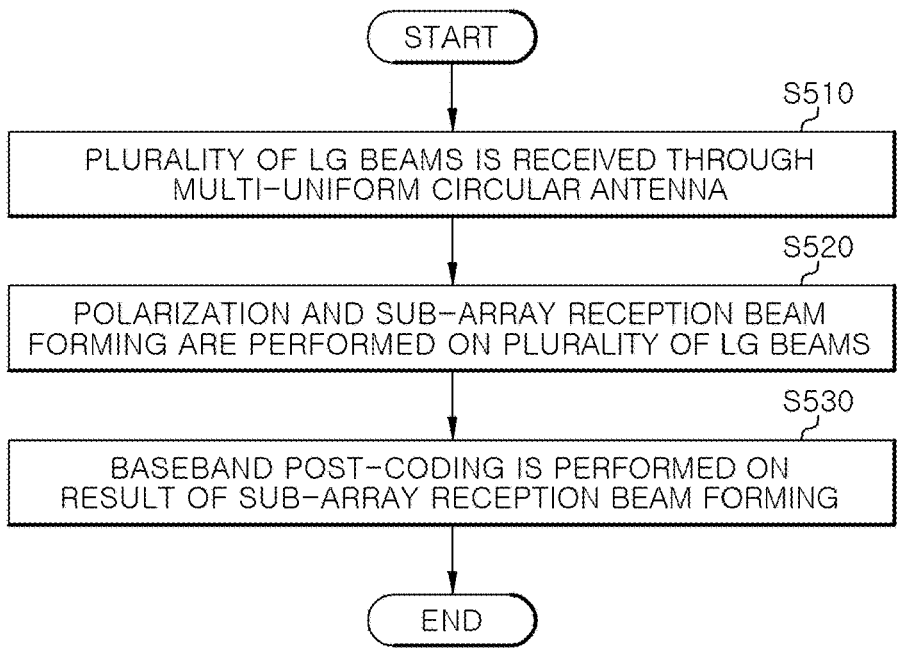

START

S510
PLURALITY OF LG BEAMS IS RECEIVED THROUGH
MULTI-UNIFORM CIRCULAR ANTENNA

S520
POLARIZATION AND SUB-ARRAY RECEPTION BEAM
FORMING ARE PERFORMED ON PLURALITY OF LG BEAMS

S530
BASEBAND POST-CODING IS PERFORMED ON
RESULT OF SUB-ARRAY RECEPTION BEAM FORMING

END

METHOD FOR TRANSMITTING LAGUERRE-GAUSSIAN BEAMS USING MULTI-UNIFORM CIRCULAR ANTENNA, METHOD FOR RECEIVING LAGUERRE-GAUSSIAN BEAMS, AND COMMUNICATION SYSTEM USING MULTI-UNIFORM CIRCULAR ANTENNA

STATEMENT REGARDING GOVERNMENT SPONSORED RESEARCH OR DEVELOPMENT

This work was supported by Institute of Information & communications Technology Planning & Evaluation (IITP) grant funded by Korea government (MSIT; Ministry of Science and ICT) (No. 2019-0-00500, Development of Spatial Multiplexing Transmission Technology for 6th Generation Mobile Communications, and No. 2020-0-01787, Development of Convergent Communication and Computing Innovation Technology for Superintelligent Services).

CROSS-REFERENCE TO RELATED APPLICATION

This application claims priority to Korean Patent Application No. 10-2023-0190676, filed on Dec. 26, 2023, the entirety of which is incorporated herein by reference for all purposes.

TECHNICAL FIELD

The present disclosure relates to a transmission apparatus, a transmission method, and a reception apparatus using a multi-uniform circular antenna (multi-uniform circular array), and a communication system for the transmission apparatus, the transmission method, and the reception apparatus.

BACKGROUND

A wireless communication system is advancing to a 6th generation (6G) core technology based on a sub-THz band to be able to support more users and more services.

SUMMARY

One aspect is a communication system that transmits and receives a plurality of Laguerre-Gaussian beams not only using a multi-uniform circular antenna, but also using quantization sub-array beam forming and polarization, a transmission method and apparatus for the communication system, and a reception method and apparatus for the communication system.

The aspects of the present disclosure are not limited to those disclosed herein, and other aspects not mentioned herein will be clearly understood by those skilled in the art from the following description.

Another aspect is a transmission apparatus using a multi-uniform circular antenna, the apparatus comprising: at least one of transmission-side multi-uniform circular antennas configured to transmit a plurality of Laguerre-Gaussian (LG) beams; at least one of digital beam former configured to process baseband precoding for forming the plurality of LG beams; and at least one of quantization analog beam formers configured to transmit the plurality of LG beams through the at least one of the transmission-side multi-uniform circular antenna by processing sub-array beam forming and polarization on the plurality of LG beams output from the at least one of digital beam formers, wherein a number of the at least one of digital beam formers is set corresponding to a number of the at least one of transmission-side multi-uniform circular antennas and a number of at least one of reception-side multi-uniform circular antennas, and a number of at least one of quantization analog beam formers is set corresponding to the number of the at least one of transmission-side multi-uniform circular antennas.

Another aspect is a reception apparatus using a multi-uniform circular antenna, the apparatus comprising: at least one of reception-side multi-uniform circular antennas configured to receive a plurality of Laguerre-Gaussian (LG) beams; at least one of quantization analog reception beam formers configured to process polarization on the plurality of LG beams and sub-array reception beam forming on the plurality of LG beams; and at least one of digital reception beam formers configured to process baseband post-coding on a result output from the at least one of the quantization analog reception beam formers, wherein a number of the at least one of the reception-side multi-uniform circular antennas is set corresponding to a number of at least one of transmission-side multi-uniform circular antennas, and a number of at least one of quantization analog reception beam formers is set corresponding to the number of the at least one of the reception-side multi-uniform circular antennas.

Another aspect is a transmission method using a multi-uniform circular antenna, the method comprising: processing, by at least one of digital beam formers for forming a plurality of Laguerre-Gaussian (LG) beams, baseband precoding; processing, by at least one of quantization analog beam formers, sub-array beam forming and polarization on the plurality of LG beams output from the at least one of the digital beam former; and transmitting the plurality of LG beams generated by sub-array beam forming and polarization through at least one of transmission-side multi-uniform circular antennas, wherein a number of the at least one of digital beam formers is set corresponding to a number of the at least one of transmission-side multi-uniform circular antennas and a number of at least one of reception-side multi-uniform circular antennas, and a number of at least one of quantization analog beam formers is set corresponding to the number of the at least one of transmission-side multi-uniform circular antennas.

Another aspect is a reception method using a multi-uniform circular antenna, the method comprising: receiving a plurality of Laguerre-Gaussian (LG) beams through at least one of reception-side multi-uniform circular antennas; processing, by at least one of quantization analog reception beam formers, polarization on the plurality of LG beams and sub-array reception beam forming on the plurality of LG beams; and processing, by at least one of digital reception beam formers, baseband post-coding on a result of the sub-array reception beam forming, wherein a number of the at least one of the reception-side multi-uniform circular antennas is set corresponding to a number of at least one of transmission-side multi-uniform circular antennas, and a number of at least one of quantization analog reception beam formers is set corresponding to the number of the at least one of the reception-side multi-uniform circular antennas.

Another aspect is a communication system using a multi-uniform circular antenna, the system comprising: a transmission apparatus including at least one of transmission-side multi-uniform circular antennas configured to transmit a plurality of Laguerre-Gaussian (LG) beams; and a reception apparatus including at least one of reception-side multi-uniform circular antennas configured to receive the plurality of LG beams, wherein a number of the at least one of the reception-side multi-uniform circular antennas is set corresponding to a number of the at least one of the transmission-side multi-uniform circular antennas, wherein the transmission apparatus includes at least one of digital beam former configured to process baseband precoding for forming the plurality of LG beams; and at least one of quantization analog beam formers configured to transmit the plurality of LG beams through the at least one of the transmission-side multi-uniform circular antenna by processing sub-array beam forming and polarization on the plurality of LG beams output from the at least one of digital beam formers, wherein the reception apparatus includes at least one of quantization analog reception beam formers configured to process polarization on the plurality of LG beams and sub-array reception beam forming on the plurality of LG beams; and at least one of digital reception beam formers configured to process baseband post-coding on a result output from the at least one of the quantization analog reception beam formers, and wherein a number of the at least one of quantization analog reception beam formers is set corresponding to the number of the at least one of reception-side multi-uniform circular antennas.

According to an embodiment, communication is performed by transmitting and receiving a plurality of LG beams using a multi-uniform circular antenna and using quantization sub-array beam forming and polarization.

According to such an embodiment, it is possible to compositively change an angular index and a radial index in a digital beam former using concentric multi-uniform circular antennas (multi-uniform circular arrays) and the multi-uniform circular antennas each enable beam forming through a sub-array structure.

Accordingly, there is an effect in that it is possible to transmit a lot of modes and achieve a high communication capacity by performing communication through an LG mode that is one of spatial multi-mode transmission techniques that transmit multiple streams in a sub-THz band.

BRIEF DESCRIPTION OF THE DRAWINGS

FIG. 4 is a flowchart illustrating a transmission method that is performed by the transmission apparatus 110 shown in FIG. 1.

FIG. 5 is a flowchart illustrating a reception method that is performed by the reception apparatus 120 shown in FIG. 1.

DETAILED DESCRIPTION

Figure 1:
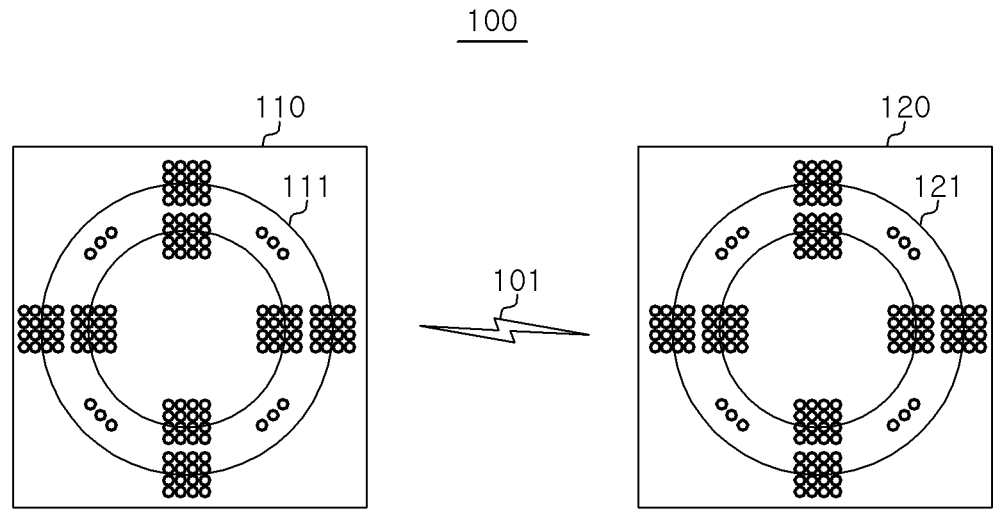
FIG. 1 is a configuration diagram of a communication system using a multi-uniform circular antenna according to an embodiment of the present disclosure.

As IoT-based devices support services with big-size data such as edge computing develop, it is required to develop a new-concept mobile communication technology that can provide a high communication capacity in a mobile environment. A spatial orthogonal multi-mode technology of such technologies is a technology of transmitting multiple streams in (multiplexing) spatial modes, which are orthogonal to each other and can overlap each other, and has the advantage in that it is possible to obtain a communication capacity gain by the number of overlap modes because orthogonality between modes is maintained in the Fresnel zone that is a closer region rather than the existing far field region. Further, studies of basically researching conditions about the structure, distance, etc. of antennas for the technology have been conducted.

In the existing basic studies of spatial multi-mode technology, studies of developing modes that can use existing 5G communication antenna structures on the basis of the antenna structures have been conducted. For example, a study of generating a multi-mode while increasing a beam forming gain using many antennas such as the massive MIMO technology has been conducted. For example, a Gaussian beam type was proposed, an orthogonal multi-mode technology such as orbital angular momentum (OAM) and hermite-gaussian (HG) can generate a mode through signal processing, and an antenna structure for configuring the technology also can use existing systems.

Such related arts have an advantage of simple generation of modes, but have the defect in that they cannot generate many modes due to a simple structure. In particular, in the OAM, there is a point at which a mode gain does not increase in specific antennal dimensions even though the number of antennas is increased, which acts as a fatal defect in 6G antenna systems that require many antennas. Further, in the HG mode as well, as the number of modes increases, necessary phase values increase and it is difficult to manufacture a serial port profile (SPP) antenna for the phase values. Accordingly, there is a new mode transmission technology that can provide a high communication capacity while being able to replace the existing OAM and HG modes.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
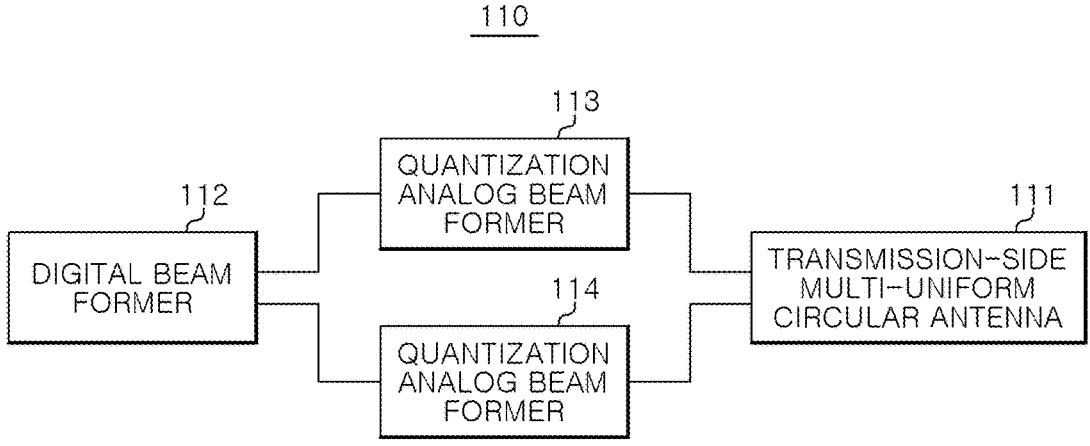
FIG. 2 is a configuration diagram of a transmission apparatus shown in FIG. 1.
Figure 3:
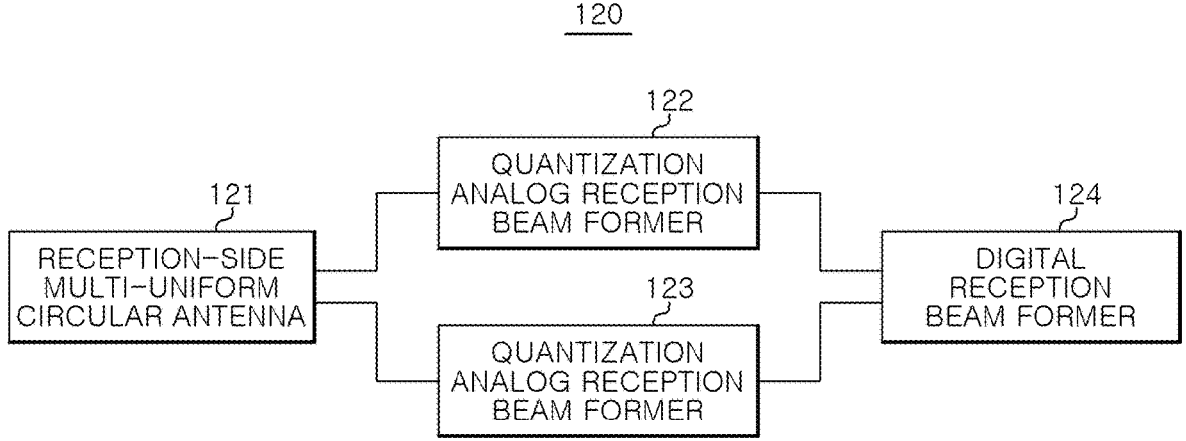
FIG. 3 is a configuration diagram of a reception apparatus shown in FIG. 1.

FIG. 1 is a configuration diagram of a communication system using a multi-uniform circular antenna according to an embodiment of the present disclosure, FIG. 2 is a configuration diagram of a transmission apparatus shown in FIG. 1, and FIG. 3 is a configuration diagram of a reception apparatus shown in FIG. 1.

Referring to FIGS. 1 to 3, a communication system 100 includes a transmission apparatus 110 including a transmission-side multi-uniform circular antenna 111 that can transmit a plurality of LG beams, and a reception apparatus 120 including a reception-side multi-uniform circular antenna 121 that receives a plurality of LG beams in correspondence to the number of the transmission-side multi-uniform circular antennas 111, in which an LG mode channel 101 may be formed between the transmission apparatus 110 and the reception apparatus 120.

The transmission apparatus 110 further includes a digital beam former 112 that performs baseband precoding for forming a plurality of LG beams, and a plurality of quantization analog beam formers 113 and 114 that transmits a plurality of LG beams through the transmission-side multi-uniform circular antenna 111 by performing sub-array beam forming and polarization on the output of the digital beam former 112 in correspondence to the number of the transmission-side multi-uniform circular antennas 111. Although two quantization analog beam formers 113 and 114 are shown in FIG. 2, this is only an example corresponding to the number of the transmission-side multi-uniform circular antenna 111 and the reception-side multi-uniform circular antenna 121. For example, the number of the transmission-side multi-uniform circular antennas 111, the number of the reception-side multi-uniform circular antennas 121, and the number of the quantization analog beam formers 113 and 114 may be the same. Further, an LG wave equation is modeled in the digital beam former 112 on the basis of a transmission/reception characteristic value of the transmission-side multi-uniform circular antenna 111 and the reception-side multi-uniform circular antenna 121, and the transmission/reception characteristic value may be obtained by measuring the distance between the transmission-side multi-uniform circular antenna 111 and the reception-side multi-uniform circular antenna 121 through a channel estimation method. Each of the quantization analog beam formers 113 and 114 may include a digital-analog converter, an RF chain, and a plurality of phase shifters.

The reception apparatus 120 further includes a plurality of quantization analog reception beam formers 122 and 123 that performs polarization and sub-array reception beam forming on a plurality of LG beams in correspondence to the number of the reception-side multi-uniform circular antennas 121, and a digital beam former 124 that performs baseband precoding on the output of the plurality of quantization analog reception beam formers 122 and 123. Although two quantization analog reception beam formers 122 and 123 are shown in FIG. 3, this is only an example corresponding to the number of the transmission-side multi-uniform circular antenna 111 and the reception-side multi-uniform circular antenna 121. For example, the number of the transmission-side multi-uniform circular antennas 111, the number of the reception-side multi-uniform circular antennas 121, and the number of the quantization analog reception beam formers 122 and 123 may be the same. Further, an LG wave equation is modeled on the basis of a transmission/reception characteristic value of the transmission-side multi-uniform circular antenna 111 and the reception-side multi-uniform circular antenna 121 in the digital reception beam former 124, and the transmission/reception characteristic value may be obtained by measuring the distance between the transmission-side multi-uniform circular antenna 111 and the reception-side multi-uniform circular antenna 121 through a channel estimation method. Each of the quantization analog reception beam formers 122 and 123 may include an analog-digital converter, an RF chain, and a plurality of phase shifters.

FIG. 4 is a flowchart illustrating a transmission method that is performed by the transmission apparatus 110 shown in FIG. 1 and FIG. 5 is a flowchart illustrating a reception method that is performed by the reception apparatus 120 shown in FIG. 1.

Figure 6:
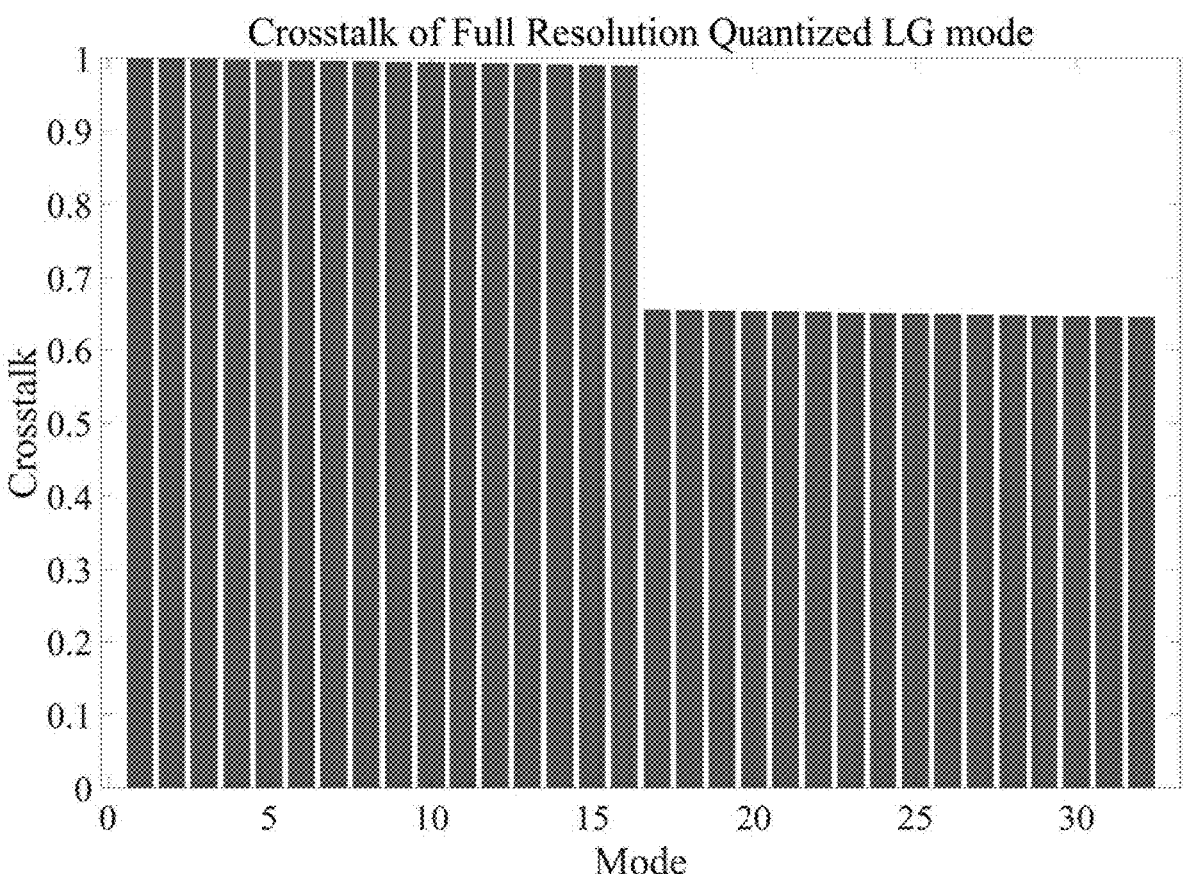
FIGS. 6 to 8 are graphs showing crosstalk in various modes.
Figure 7:
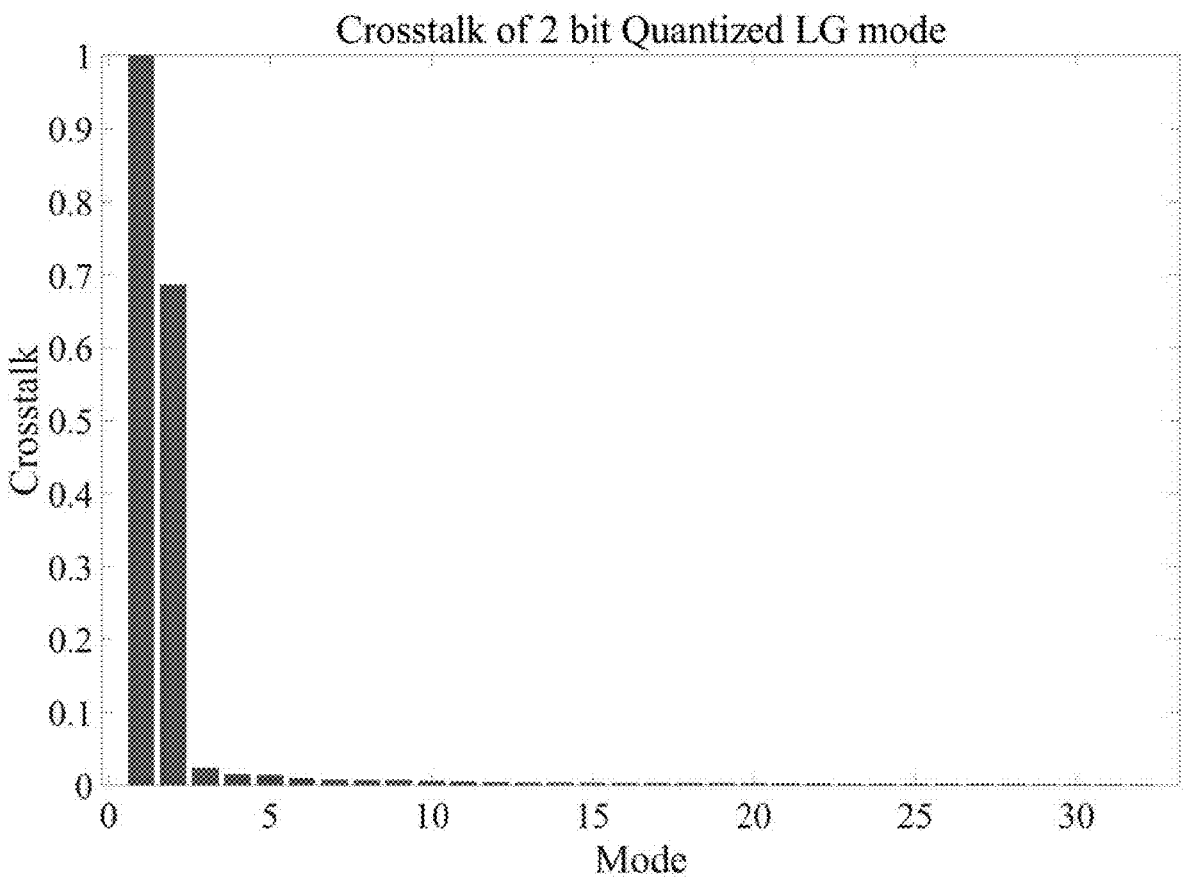
Figure 8:
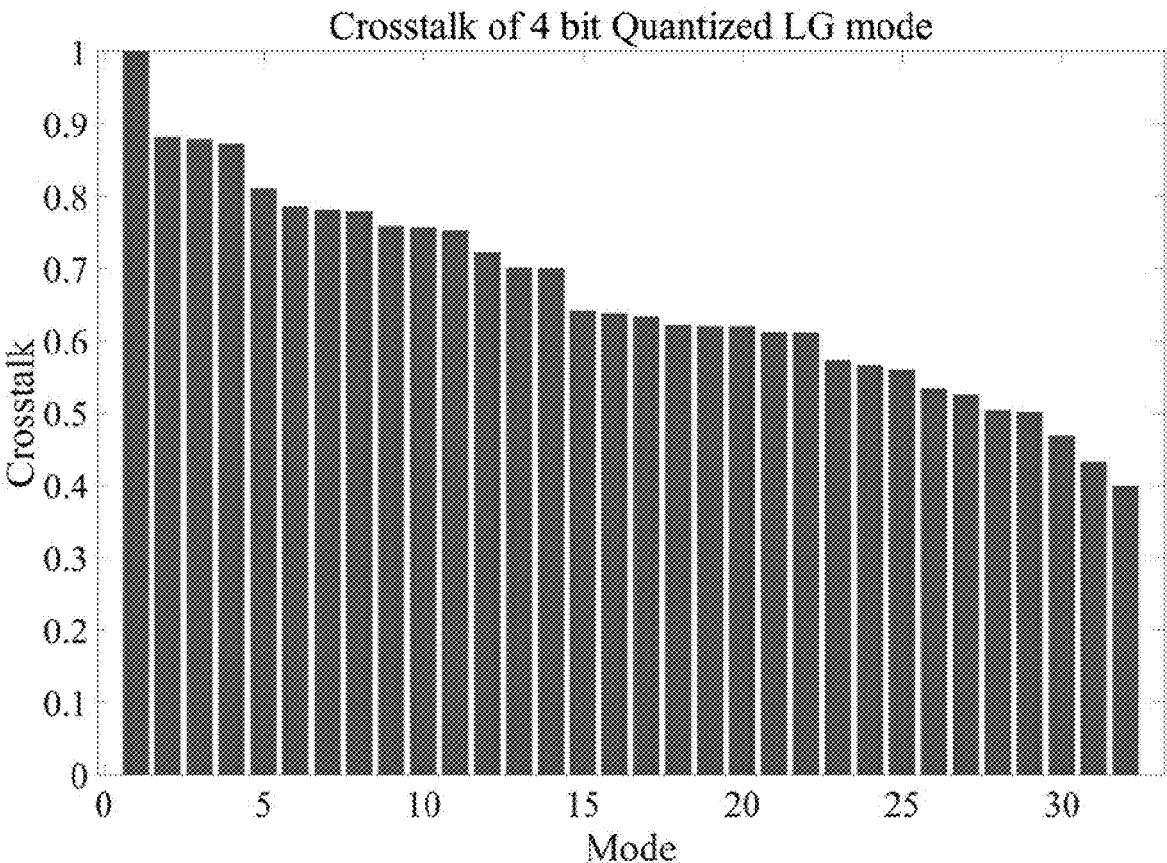
Figure 9:
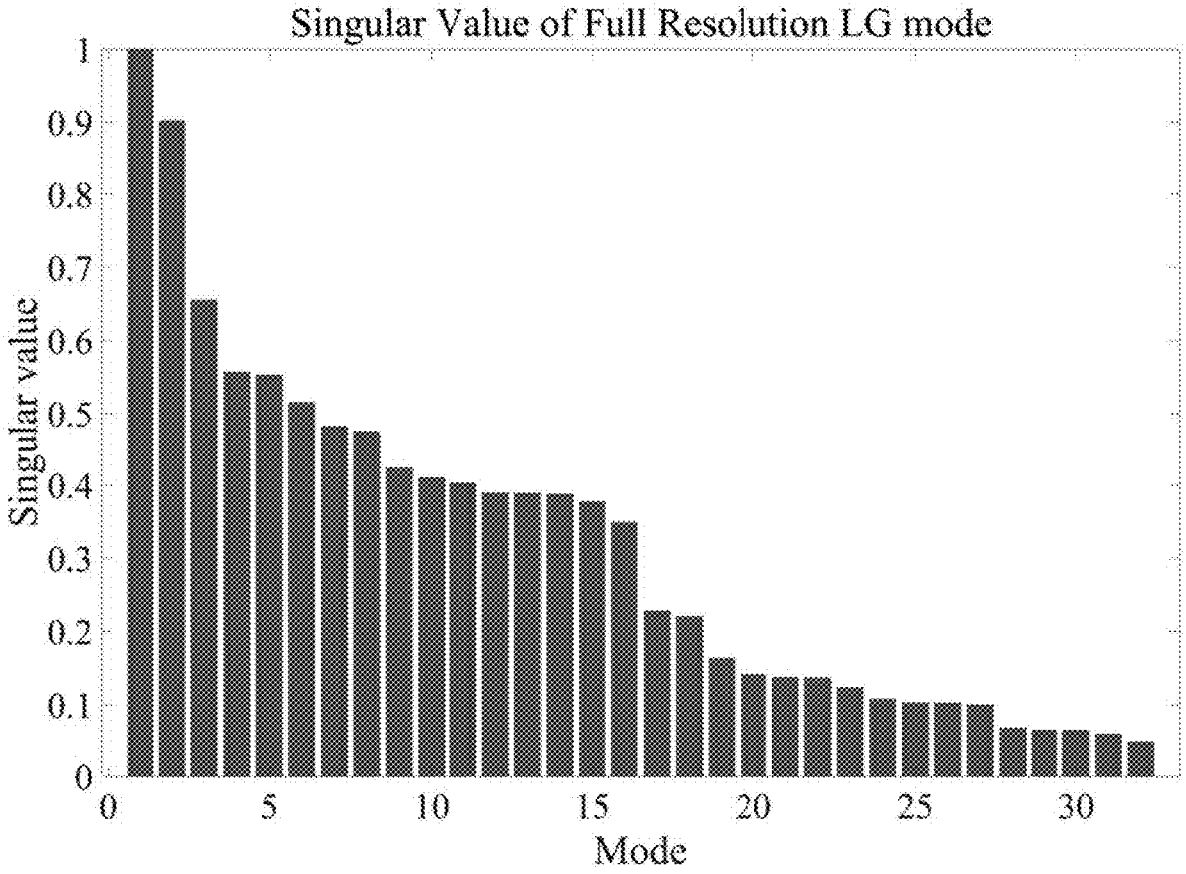
FIGS. 9 to 11 are graphs showing transmittable modes according to quantization levels for analog beam forming.
Figure 10:
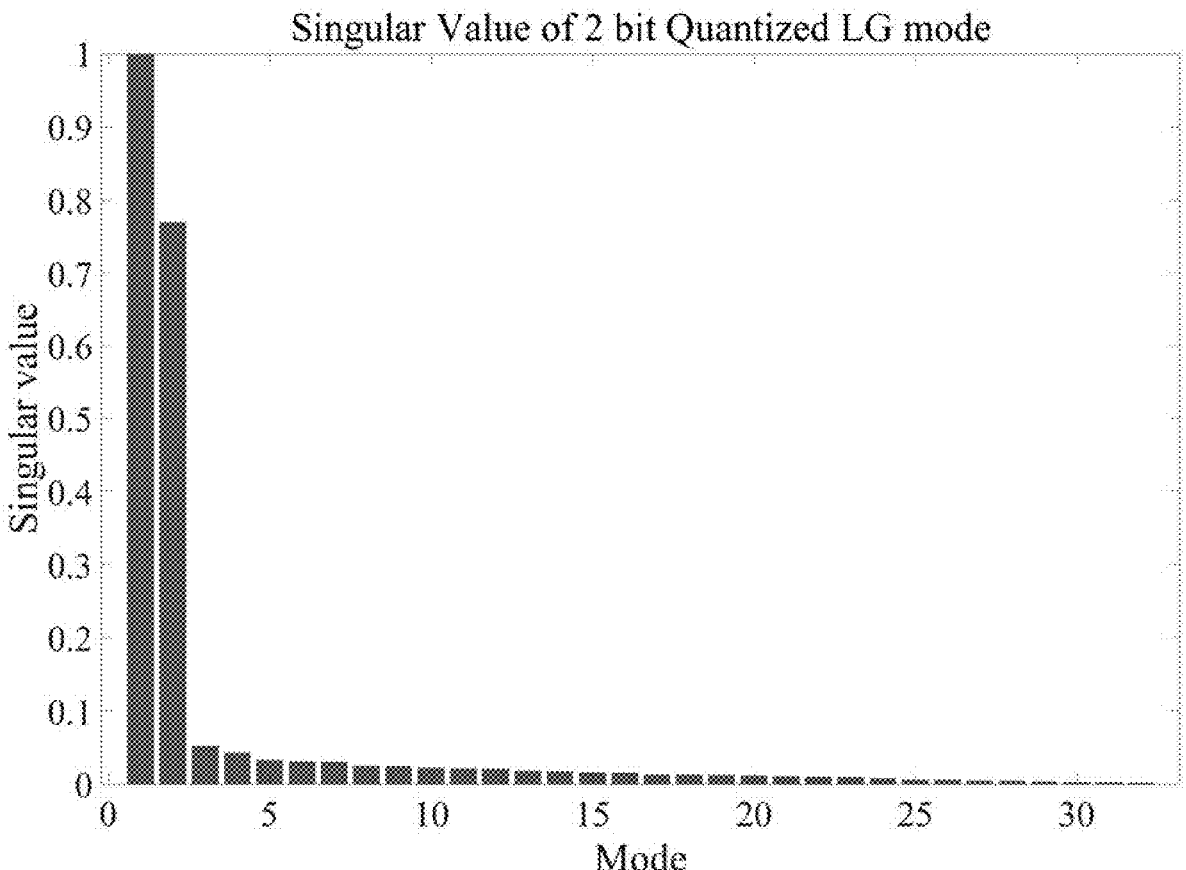
Figure 11:
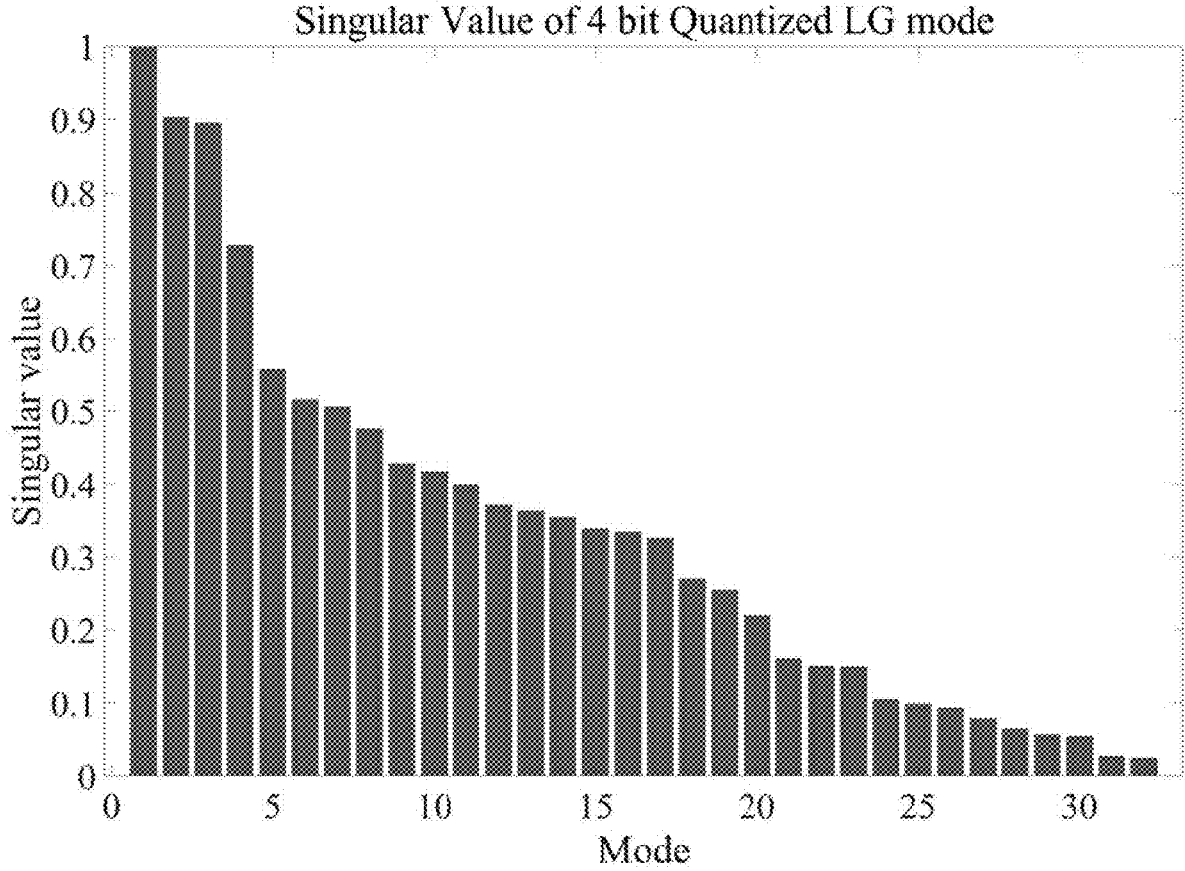
Figure 12:
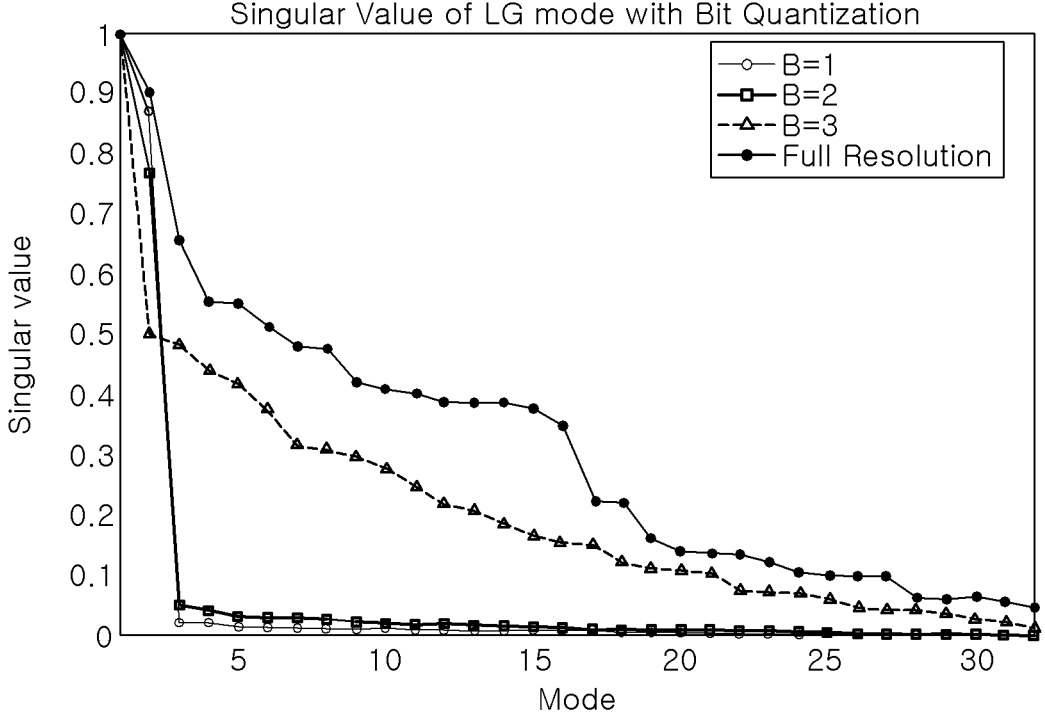
FIG. 12 is a graph showing transmittable modes through singular values of FIG. 11.
Figure 13:
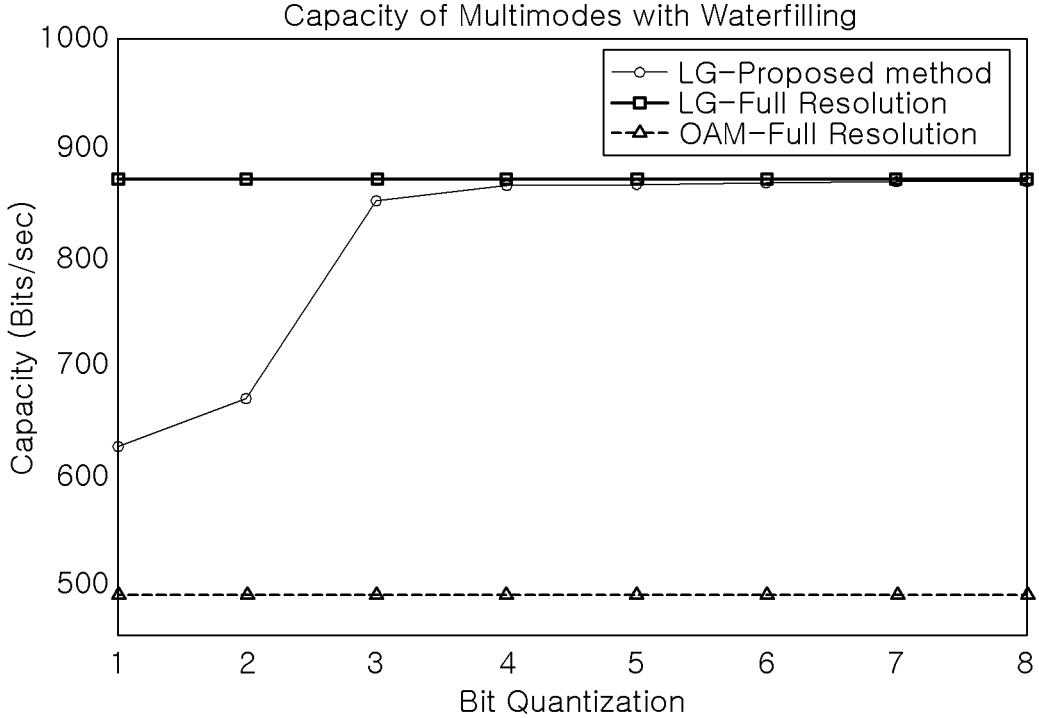
FIG. 13 is a graph showing maximum transmittable capacity values in a communication method according to an embodiment of the present disclosure and another communication method.

FIGS. 6 to 8 are graphs showing crosstalk in various modes, FIGS. 9 to 11 are graphs showing transmittable modes according to quantization levels for analog beam forming, FIG. 12 is a graph showing transmittable modes through singular values of FIG. 11, and FIG. 13 is a graph showing maximum transmittable capacity values in a communication method according to an embodiment of the present disclosure and another communication method.

Hereafter, a signal transmission/reception method that uses the transmission-side multi-uniform circular antenna 111 and the reception-side multi-uniform circular antenna 121 in the communication system 100 according to an embodiment of the present disclosure is described in detail. As in the example of FIGS. 1 to 3, a communication system 100 in which the transmission-side multi-uniform circular antenna 111 and the reception-side multi-uniform circular antenna 121 are each provided in a pair is considered.

The distance D between the transmission-side multi-uniform circular antenna 111 and the reception-side multi-uniform circular antenna 121 satisfies $D \leq 2R^2/\lambda$ to be able to come into the Fresnel zone in which orthogonality of a spatial multi-mode is maintained. The transmission-side multi-uniform circular antenna 111 and the reception-side multi-uniform circular antenna 121 are each composed of a total of MN antennas, and M sub-array antennas transmit a total of N streams. Accordingly, the communication system 100 can transmit a total of 2N streams. An LG mode channel 101 has 2N modes orthogonal to each other to be able to transmit a total of 2N streams and this is defined through a common wave equation of LG mode proposed in Equation 1.

$$\Psi(r, \theta, z) = \frac{w_o}{w(z)}\left(\frac{\sqrt{2}\,r}{w(z)}\right)^{|l|}\exp\left(-\frac{r^2}{w^2(z)}\right) \qquad \text{EQUATION 1}$$

$$L_p^{|l|}\left(\frac{2r^2}{w^2(z)}\right)\exp\left(-ik\frac{r^2}{2R(z)}\right)\exp(-il\theta)\exp(i\varphi(z))$$

where $$R(Z) = z + z_R/z,$$

$$\varphi(z) = (N+1)\arctan\left(\frac{z}{z_R}\right),$$

$$N = 2p + |l|,$$

$$w_o^2 = 2z_R/k,$$

$$w^2 = 2(z^2 + z_R^2)/kz_R,$$

and $$w^2 = 2(z^2 + z_R^2)/kz_R.$$

The number of modes that can be sent is defined as N, Z is the distance between antennas, Wo is beam weight, and r and e show the polar coordinates of a specific position at which a wave exists. In order to be able to transmit a total of N modes on the basis of Equation 1, the transmission-side multi-uniform circular antenna 111 and the reception-side multi-uniform circular antenna 121 can transmit 2L=2N modes through two multi-uniform circular antenna groups while transmitting a total of L=N modes.

It is required to find out and apply components that have influence in accordance with variation of a mode value in order to implement a system that can generate an LG mode on the basis of the above Equation 1. For example, in the case of an OAM mode, a component such as $\exp(-il\theta)$ is constructed through a uniform circular antenna (UCA) and a DFT matrix, so it is possible to easily generate the OAM mode through signal processing.

The digital beam former 112 of the transmission apparatus 110 performs signal processing on a large number of uniform circular antennas to be able to generate many LG beams. For example, there are a UCA 1 and a UCA 2 that are concentric, p=0, 1 and l=0, . . . , N−1 in Equation 1 are simultaneously transmitted (S410).

A mode augmentation process is performed in the quantization analog beam formers 113 and 114 through sub-array beam forming and polarization on the basis of a signal processed by the digital beam former 112. A signal is converted into an analog signal through the digital-analog converters of the quantization analog beam formers 113 and 114 and the phase is adjusted through the phase shifter connected with the RF chain. It is possible to generate a signal having a desired LG mode through this process.

In this case, it is possible to increase the beam forming gain of each uniform circular antenna component through a sub-array structure. Each sub-array system is composed of M square arrays and these are constant beam former structures and have an effect that many sub-UCA transmit them. The communication system 100 that requires a lot of antennas can solve the problem of an existing OAM that a beam forming gain decreases, using a sub-array structure to be described below. Thereafter, it is possible to augment an additional mode by dividing the polarization manner into a horizontal direction (H-pole) and a vertical direction (V-pole) in a broad meaning (S420).

The transmission apparatus 110 transmits a plurality of LG beams generated through sub-array beam forming and polarization using the transmission-side multi-uniform circular antenna 111, and the LG beams pass through the LG model channel 101, for example, a massive-MIMO channel (S430).

The communication system 100 may consider a spherical wave channel model like Equation 2 to fit to a sub-THz characteristic.

$$h_{i,j} = \beta\frac{\lambda}{4\pi d_{i,j}}\exp\left(-j\frac{2\pi}{\lambda}d_{i,j}\right) \qquad \text{EQUATION 2}$$

where $\lambda$ is a wavelength, $\beta$ is an antenna gain, and $d_{i,j}$ is the distance between the i-th component and the j-th component of a transmission antenna. Assuming that a multi UCA channel based on this is H, a received signal z is expressed as Equation 3.

$$z = U^H H U_S \qquad \text{EQUATION 3}$$

where U is a matrix that means a beam former proposed in the present disclosure, and is an hermitian matrix of a matrix U which is expressed as $U^H$ in precoding. In this case, for the characteristics of a spatial multi-mode, the $U^H H U$ part is called an effective channel, and when this part is a diagonal matrix, an intact orthogonal mode transmission is possible. In order to determine interference between modes or a gain, it is possible to calculate a gain value of a dominant mode generally through operation called singular value decomposition (SVD) A theoretical channel capacity when an LG mode is transmitted on the basis of this is expressed as in Equation 4.

$$C_{LG} = \log_2\det\left(I_{2N} + \rho P\Delta\Delta^H\right) = \qquad \text{EQUATION 4}$$

$$\log_2\det\left(I_{2N} + \rho P U^{jH} H U U H U^{jH}\right) = \sum_{i=1}^{2N-1}\log_2\det\left(1 + \rho|\delta_i|^2\right)$$

where P is a power allocation matrix that is calculated through a waterfilling method and $\Delta$ is an effective channel.

$$\rho = SNR \times 2N / \|H\|_F^2$$

and an i-th gain that can carry an LG mode is defined as $|\delta_i|^2$. It is seen that, in the case of an LG mode that can obtain more modes in comparison to general UCA-based OAM mode transmission, it is possible to obtain a higher channel communication capacity.

The reception operation of the reception apparatus 120 that receives a plurality of LG beams through the reception-side multi-uniform circular antenna 121 (S510), performs polarization and sub-array reception beam forming on each of the plurality of LG beams (S520), and performs baseband post-coding on the result of sub-array reception beam forming using the digital reception beam former 124 (S530) can be achieved by reversely performing the transmission operation of the transmission apparatus 110.

Parameter setting may be performed as follows to check the performance of the communication system 100. It is possible to set a frequency in a sub-THz frequency range as f=150 GHz, it is possible to set the radii of two uniform circular antennas as 0.50m and 0.25m, respectively, and it is possible to use 400 antennas for one UCA, that is, a total of 800 antennas.

FIGS. 6 to 8 are crosstalk graphs through which it is possible to check interference between 2N considered modes. In this case, a full resolution method is a manner of implementing an LG wave equation one to one on the basis of Equation 1 without quantization and has high complexity in actual implementation. In this case, it can be seen that the former 16 modes are l=0, . . . , 15 modes for p=0 and the latter 16 modes are l=0, . . . , 15 modes for p=1. It can be seen that the communication system 100 shows a tendency similar to the full resolution as the bit quantization level increases. In particular, the 4 bit quantization shows a tendency that desired modes are restored well and orthogonality is maintained between different modes.

FIGS. 9 to 11 are graphs that arrange and compare singular values in descending order to be able to calculate the gain of each mode and calculate a communication capacity later on the basis of the gains. Similar to FIGS. 6 to 8, it can be seen that the communication system 100 shows similar performance as the quantization level increases in comparison to full resolution. In particular, in the case of 4 bit, 16 pieces are generated at the most (generally, 6~8 pieces are generated) even though a large number of antennas are used in an existing OAM, but it can be seen that the communication system 100 can generate augmented modes because it uses even the p=1 mode.

FIG. 12 shows relative ratios of singular values according to quantization levels. It is possible to know how many modes can be transmitted in each step. It can be seen that as the quantization level increases, it becomes close to the graph of full resolution. Further, it is secured that it is possible to increase the number of modes through polarization by a quantization analog beam former that is additionally considered. Accordingly, it can be seen that mode transmission is possible, and accordingly, a capacity can be increased.

FIG. 13 is a graph that analyzes a maximum communication capacity, which can be achieved through mode augmentation, in accordance with the quantization levels of the communication system 100. First, a result that the communication capacity of an LG mode considered in accordance with an embodiment of the present disclosure is higher than the communication capacity of the existing OAM mode was obtained, and this is because the number and gain of modes that the LG mode can have are high. It can be seen that as the quantization level additionally increases, the communication capacity value of the full resolution manner can be achieved, and accordingly, the communication system 100 can achieve communication capacity augmentation that is the core of a 6G system by generating a spatial multi-mode.

As described above, according to embodiments of the present disclosure, communication is performed by transmitting and receiving a plurality of LG beams using multi-uniform circular antennas and using quantization sub-array beam forming and polarization.

According to an embodiment, it is possible to compositively change an angular index and a radial index in a digital beam former using concentric multi-uniform circular antennas and the multi-uniform circular antennas each enable beam forming through a sub-array structure.

Accordingly, it is possible to transmit a lot of modes and achieve a high communication capacity by performing communication through an LG mode that is one of spatial multi-mode transmission techniques that transmit multiple streams in a sub-THz band.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A transmission method using a multi-uniform circular antenna, the transmission method comprising:

processing, by at least one of digital beam formers for forming a plurality of Laguerre-Gaussian (LG) beams, baseband precoding;

processing, by at least one of quantization analog beam formers, sub-array beam forming and polarization on the plurality of LG beams output from the at least one of the digital beam formers; and transmitting the plurality of LG beams generated by the sub-array beam forming and polarization through at least one of transmission-side multi-uniform circular antennas, wherein the at least one of the digital beam formers is configured to process the baseband precoding for forming the plurality of LG beams, wherein the at least one of the quantization analog beam formers is configured to transmit the plurality of LG beams through the at least one of the transmission-side multi-uniform circular antennas by processing the sub-array beam forming and polarization on the plurality of LG beams output from the at least one of the digital beam formers, and wherein an LG wave equation is modeled in the at least one of the digital beam formers on the basis of a transmission/reception characteristic value of the at least one of the transmission-side multi-uniform circular antennas and at least one of reception-side multi-uniform circular antennas.

2. The transmission method of claim 1, wherein the transmission/reception characteristic value is obtained by measuring a distance between the at least one of the transmission-side multi-uniform circular antennas and the at least one of the reception-side multi-uniform circular antennas through a channel estimation method.

3. A reception method using a multi-uniform circular antenna, the method comprising:

receiving a plurality of Laguerre-Gaussian (LG) beams through at least one of reception-side multi-uniform circular antennas;

processing, by at least one of quantization analog reception beam formers, polarization on the plurality of LG beams and sub-array reception beam forming on the plurality of LG beams; and processing, by at least one of digital reception beam formers, baseband post-coding on a result of the sub-array reception beam forming, wherein a number of the at least one of the reception-side multi-uniform circular antennas is set corresponding to a number of at least one of transmission-side multi-uniform circular antennas, and a number of the at least one of the quantization analog reception beam formers is set corresponding to the number of the at least one of the reception-side multi-uniform circular antennas, and wherein an LG wave equation is modeled in the at least one of the digital reception beam formers on the basis of a transmission/reception characteristic value of the at least one of the transmission-side multi-uniform circular antennas and the at least one of the reception-side multi-uniform circular antennas.

4. The reception method of claim 3, wherein the transmission/reception characteristic value is obtained by measuring a distance between the at least one of the transmission-side multi-uniform circular antennas and the at least one of the reception-side multi-uniform circular antennas through a channel estimation method.

5. A communication system using a multi-uniform circular antenna, the system comprising:

a transmission apparatus including at least one of transmission-side multi-uniform circular antennas configured to transmit a plurality of Laguerre-Gaussian (LG) beams; and a reception apparatus including at least one of reception-side multi-uniform circular antennas configured to receive the plurality of LG beams, wherein a number of the at least one of the reception-side multi-uniform circular antennas is set corresponding to a number of the at least one of the transmission-side multi-uniform circular antennas, wherein the transmission apparatus includes:

at least one of digital beam formers configured to process baseband precoding for forming the plurality of LG beams, and at least one of quantization analog beam formers configured to transmit the plurality of LG beams through the at least one of the transmission-side multi-uniform circular antennas by processing sub-array beam forming and polarization on the plurality of LG beams output from the at least one of the digital beam formers, wherein the reception apparatus includes at least one of quantization analog reception beam formers configured to process polarization on the plurality of LG beams and sub-array reception beam forming on the plurality of LG beams; and at least one of digital reception beam formers configured to process baseband post-coding on a result output from the at least one of the quantization analog reception beam formers, wherein a number of the at least one of the quantization analog reception beam formers is set corresponding to the number of the at least one of the reception-side multi-uniform circular antennas, and wherein an LG wave equation is modeled in the at least one of the digital beam formers on the basis of a transmission/reception characteristic value of the at least one of the transmission-side multi-uniform circular antennas and the at least one of the reception-side multi-uniform circular antennas.

6. The communication system of claim 5, wherein the transmission/reception characteristic value is configured to be obtained by measuring a distance between the at least one of the transmission-side multi-uniform circular antennas and the at least one of the reception-side multi-uniform circular antennas through a channel estimation method.

7. The communication system of claim 5, wherein the LG wave equation is configured to be modeled in the at least one of the digital reception beam formers on the basis of the transmission/reception characteristic value of the at least one of the transmission-side multi-uniform circular antennas and the at least one of the reception-side multi-uniform circular antennas.

8. The communication system of claim 7, wherein the transmission/reception characteristic value is configured to be obtained by measuring a distance between the at least one of the transmission-side multi-uniform circular antennas and the at least one of the reception-side multi-uniform circular antennas through a channel estimation method.

* * * * *